United States Patent [19]
Guthrie

[11] Patent Number: 6,135,904
[45] Date of Patent: Oct. 24, 2000

[54] BICYCLE DERAILLEUR CHAIN DAMPER

[76] Inventor: Ryan G. Guthrie, 1841 Otter St., Anchorage, Ak. 99504

[21] Appl. No.: 09/181,368

[22] Filed: Oct. 28, 1998

[51] Int. Cl.[7] ........................................ F16H 7/08
[52] U.S. Cl. ................................................ 474/82
[58] Field of Search .................. 474/78, 79, 80, 474/81, 82, 101, 116, 117, 118, 124, 138

[56] References Cited

U.S. PATENT DOCUMENTS

| | | | |
|---|---|---|---|
| 3,896,679 | 7/1975 | Huret et al. | 474/82 |
| 4,430,978 | 2/1984 | Huret | 474/82 |
| 4,552,546 | 11/1985 | Ishikawa | 474/82 |
| 4,850,940 | 7/1989 | Nagano | 474/80 |
| 4,960,402 | 10/1990 | Klein et al. | 474/80 |
| 5,397,275 | 3/1995 | McJunkin, Jr. | 474/147 |
| 5,669,840 | 9/1997 | Liao | 474/80 |

*Primary Examiner*—Thomas R. Hannon
*Attorney, Agent, or Firm*—Michael Tavella

[57] ABSTRACT

A damper that functions in cooperation with the chain take-up to introduce improved smoothness during bicycle operation. The hydraulic damper is a cylinder that has a spring driven piston mounted in it. The spring is controlled by a fluid within the cylinder. This fluid smoothes out or otherwise controls jerky or other unwanted vibration by applying fluid forces to the take-up piston so that a relatively constant pressure is applied against the drive chain. This allows that chain to flow over the sprockets and chain slides without, looseness, unintentional gear shifts or objectionable noise.

13 Claims, 6 Drawing Sheets

BICYCLE DERAILLEUR CHAIN DAMPER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates sprocket chain dampers and particularly to bicycle sprocket chain dampers.

2. Description of Related Art

Bicycles have developed over the past 20 years into much more than a simple means of transportation. High performance, multi-gear bicycles have been developed for racing, road touring and for off-road uses. The off-road bicycles are typically called "mountain bikes". These high-performance bikes create high-performance problems. One such problem is called "chain suck". This occurs when riding a bicycle over rough terrain. At these times, there are intervals during which the drive chain, particularly along its lower (return) run is subjected to varying high forces and vibration. During these intervals, the chain can whip wildly. Often, if the drive sprocket is cranked while the chain is whipping, the loose chain becomes jammed, or wedged, between the sprocket and the bicycle frame. This jamming is called "chain suck". Poor or missed shifting can be also caused by chain whip.

Several attempts have been made to avoid this problem. U.S. Pat. No. 5,397,275 teaches a solid damper that is nothing more than a split tube that is placed over the lower portion of the chain, with one end attached to the idler pulley support. The tube is designed to allow the free movement of the chain through it, under normal conditions, but its rigid body prevents wild whipping during fast, bumpy riding. Despite the advantages of this device, in practice, it does not offer a sound solution. The tube can become filled with dirt or other materials that prevent the smooth operation of the chain through it. If the tube is too rigid, it may work to over damp the chain. Such constrictions can cause problems in smooth pedaling or shifting of gears, as well as noise.

U.S. Pat. Nos. 4,786,071 and 4,960,402 teach devices to help control the chain movement. These devices, however, do little to prevent the whipping action that causes chain suck. Rather, these devices attempt to prevent the chain from becoming stuck only after the chain already has been displaced, e.g., by the forces encountered when cycling downhill off-road at high speeds.

BRIEF SUMMARY OF THE INVENTION

The instant invention is designed to overcome these problems. It uses a hydraulic (or other type) damper that functions in cooperation with the chain take-up up to damp undesirable whipping of the drive chain. The hydraulic damper can be either a rotary type damper or a piston type damper. The fluid within the damper serves as a retardant to smooth out or otherwise control jerky or other unwanted vibration so that a relatively constant pressure is applied against the drive chain. This allows that chain to flow over the sprockets and chain slides without, looseness, unintentional gear shifts, or objectionable noise.

The damper damps the rotational movement of the chain tension pulley cage pivot by acting between the pivot housing and the pulley cage. The key to its function is the tension pulley cage arm. The damper heavily damps the forward and backwards movement of the chain tensioner, thereby allowing free action of the chain, while dramatically reducing chain bounce when riding over rough terrain. This then improves chain retention, shifting, and noise reduction while riding off-road.

DETAILED DESCRIPTION OF THE INVENTION

Figure 1:
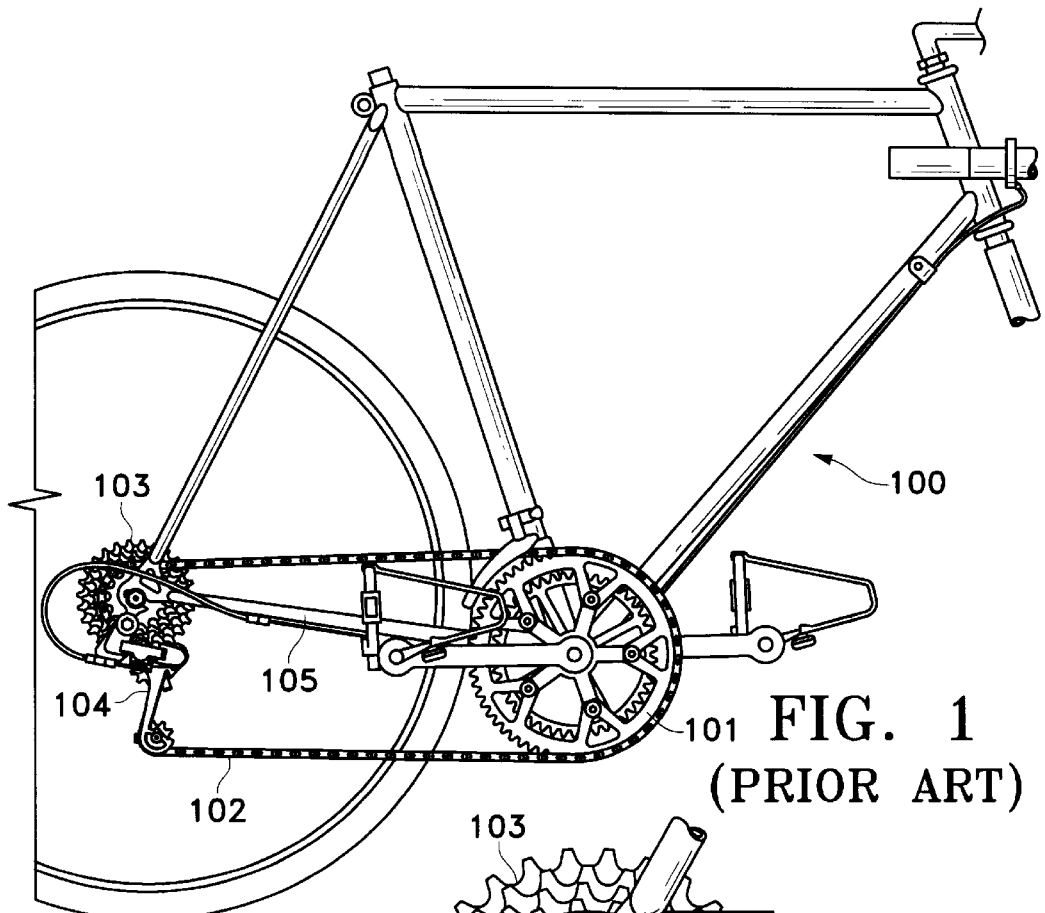
FIG. 1 is a side view of the sprocket system of a typical bicycle as prior art.
Figure 2:
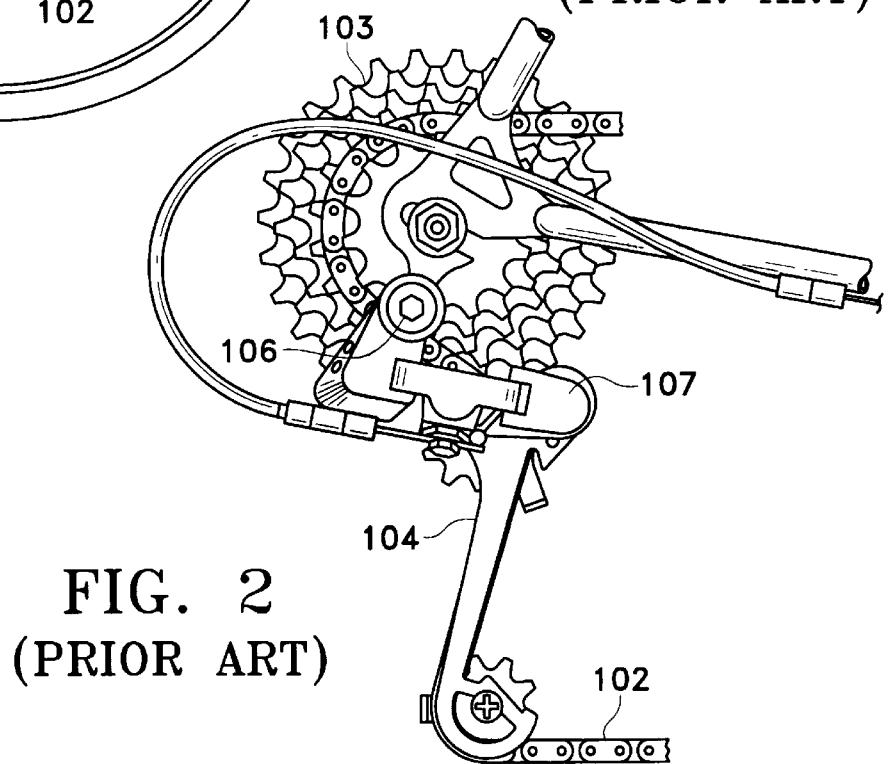
FIG. 2 is a detail view of the derailleur system of a typical bicycle as prior art.

Referring now to FIGS. 1 and 2, a typical modern bicycle 100 is shown as prior art. The bicycle has a front sprocket 101, a chain 102, a rear sprocket 103 and a derailleur 104 as shown. FIG. 2 is a detail view of the derailleur system. In ordinary operation, the derailleur 104 is used to carry the chain 102 while shifting gears. A typical derailleur has a frame pivot 106 and a chain tension pulley cage pivot 107. These pivots are spring loaded and are designed to help maintain tension on the chain during the shifting of gears and when the chain becomes otherwise slack. The derailleur can pivot forward or backwards as needed. Although this ability is necessary for the derailleur to operate, it can also cause problems when cycling over rough terrain. During such runs, the chain 102 can whip violently and can jam between the sprocket and the frame 105.

Figure 3:
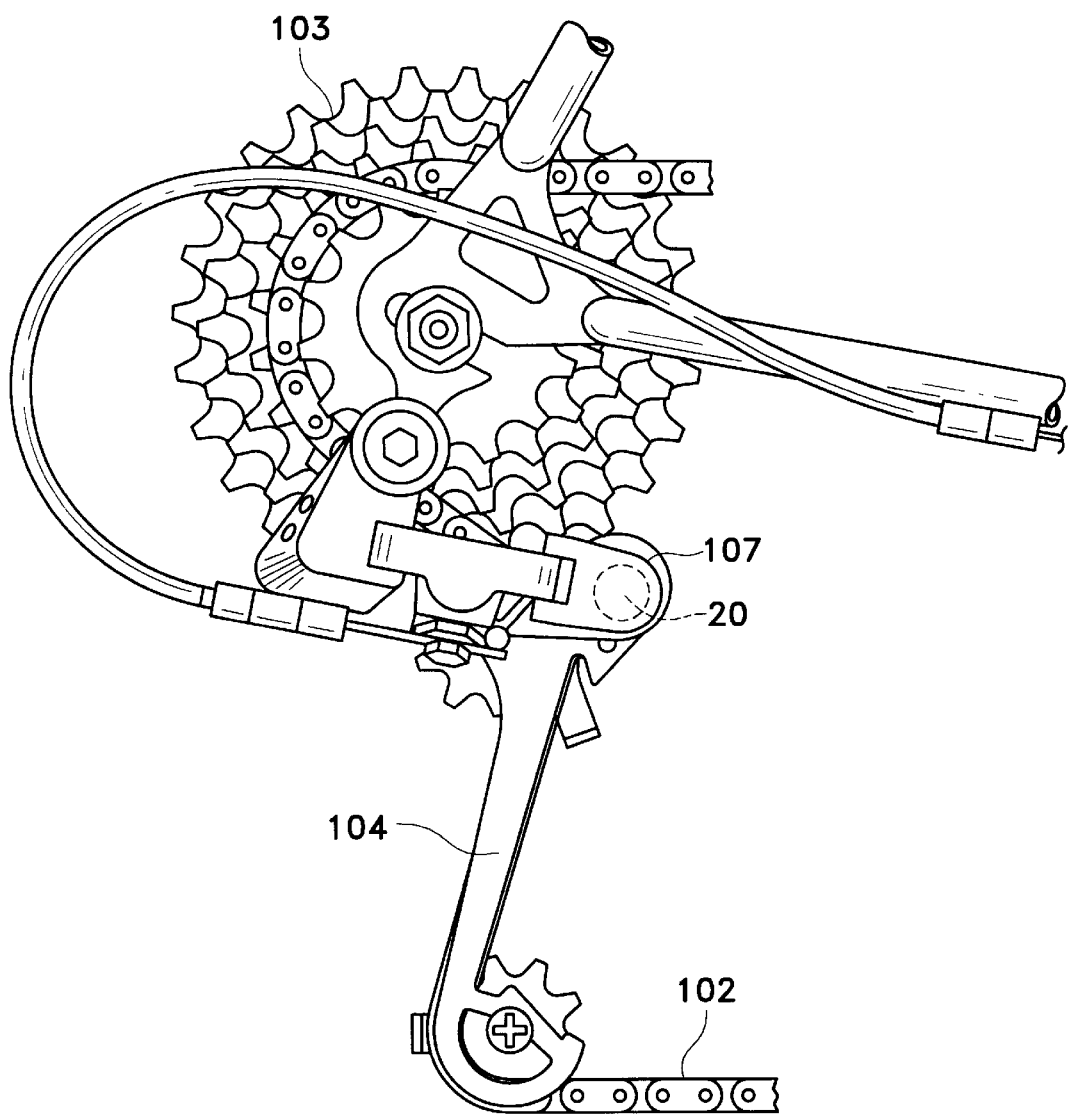
FIG. 3 is a detail view of a derailleur system showing the preferred embodiment in place in one-half compressed position.
Figure 4:
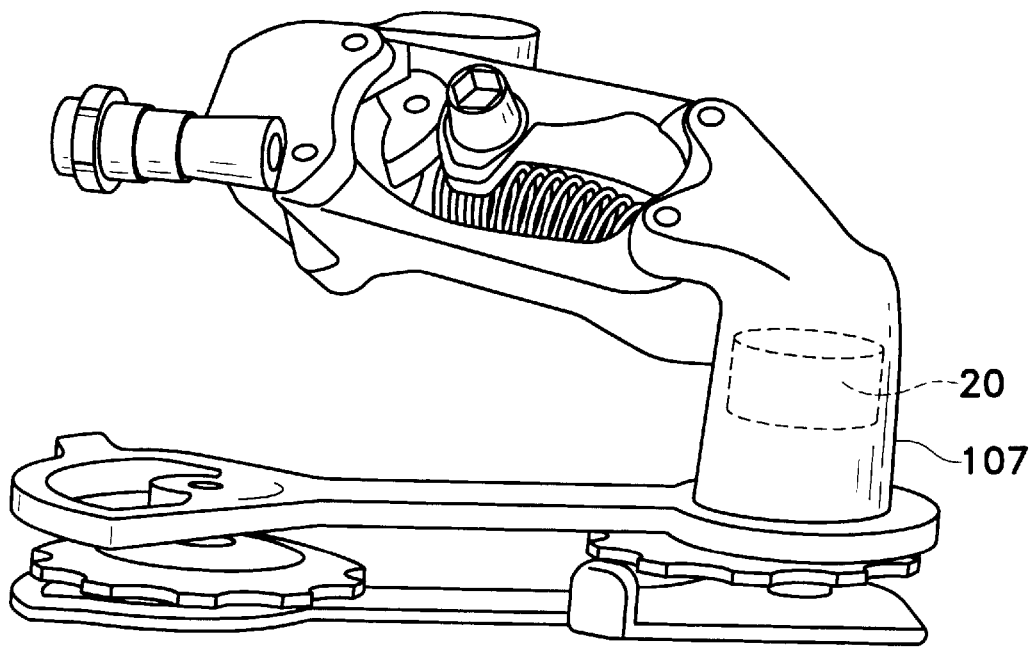
FIG. 4 is a bottom view of a derailleur showing the preferred embodiment installed within it.
Figure 5:
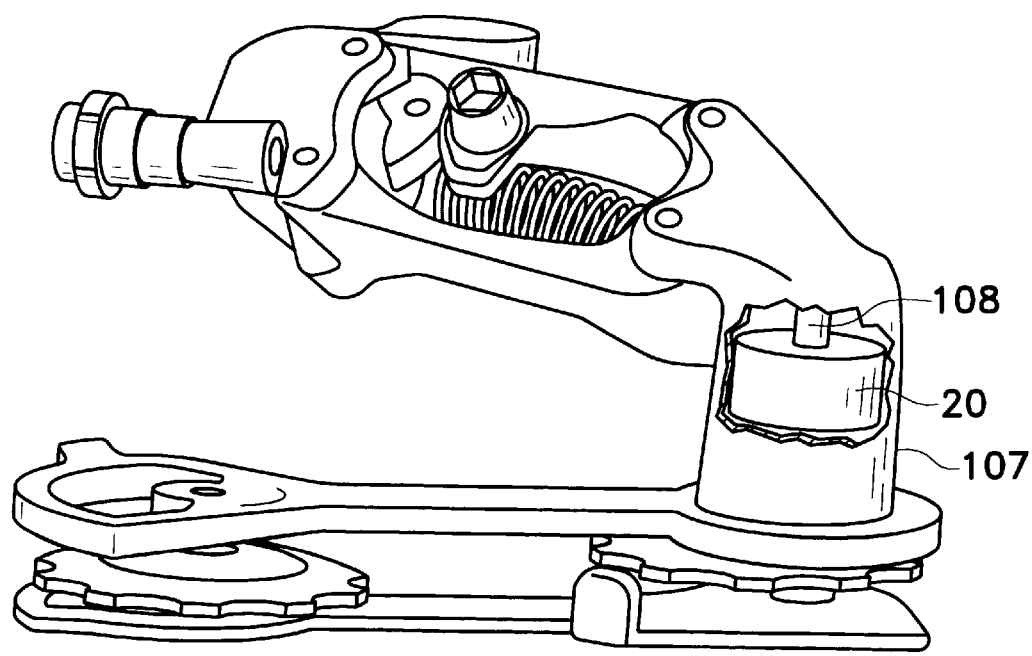
FIG. 5 is a bottom view of a derailleur with the chain tension pulley cage pivot in cutaway view showing the preferred embodiment in place within the chain tension pulley cage pivot.

To solve this problem, the preferred embodiment of the invention uses a rotary damper 20 acting against the spring tension of the chain pulley cage pivot. FIGS. 3, 4, and 5 show the use of the rotary damper. In the preferred embodiment, the rotary damper 20 is placed in the chain tension pulley cage pivot housing 107 of the derailleur. By placing the damper there it less likely to interfere with the operation of the bicycle. Moreover, it is within a sealed unit is more reliable, needs less maintenance and does not have any external parts. As installed, the rotary damper 20 works automatically to damp the force exerted by the spring within the chain pulley cage pivot as the rider operates the bicycle. There are no external parts to deal with or to add.

Although this type of damper construction is preferred, it cannot easily be retrofitted onto an existing derailleur. This is because the chain tension pulley cage pivot 107 is typically a casting sized to fit its internal components. Unless this piece is manufactured from the start to accommodate an internal rotary type damper, there is no practical way to install one later. As shown in FIG. 3, for example, the rotary damper 20 is under the outer cover of the chain tension pulley cage pivot 107. FIG. 4 shows this placement from the bottom. FIG. 5 is a bottom cutaway view. Here the rotary damper 20 is seen within the chain tension pulley cage pivot housing 107. A shaft 108 passes through the damper 20. The damper acts to restrain the movement of this shaft 108 during operation of the bicycle.

Figure 6:
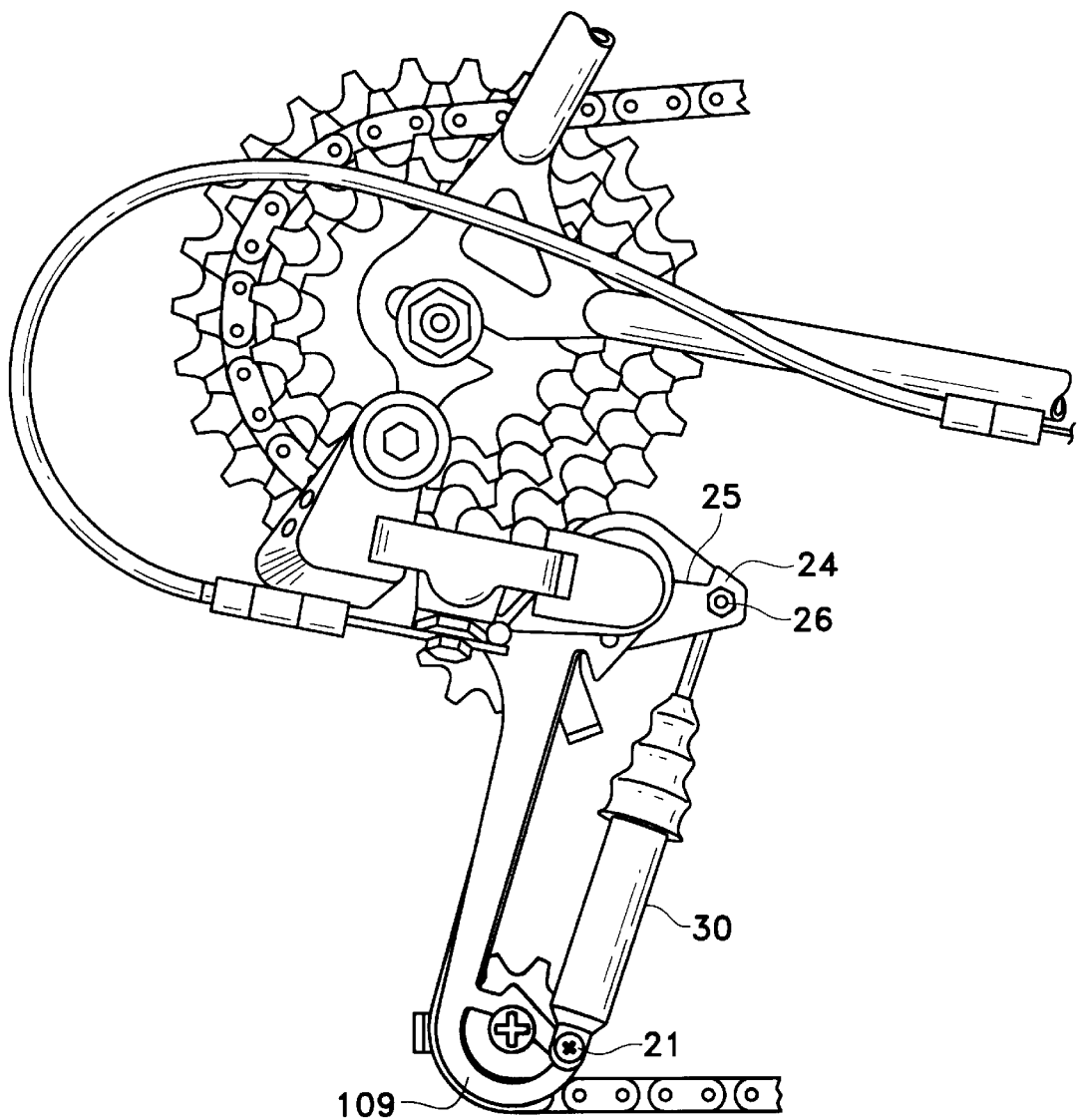
FIG. 6 is a detail view of a derailleur system showing the second embodiment of the invention in place in the one-half expanded position, showing an alternative mounting configuration.

Referring to FIG. 6, the second embodiment of the invention is shown. In this embodiment, an external damper 30 is attached to the derailleur as shown. In this embodiment, the external damper 30 is attached to the chain tension pulley cage 109 by a screw 21 through a tapped hole. The other end of the damper 30 is attached to a removable mounting bracket 24. The mounting bracket 24 has a split 25 that allows it to open and be placed over the housing 107. A bolt 26 is used to secure the damper 30 to the bracket 24. Another bolt (not shown) secures the bracket around the shaft 108. FIG. 6 shows the damper in the one-half extended position. This represents operating in the middle gear range.

Figure 7:
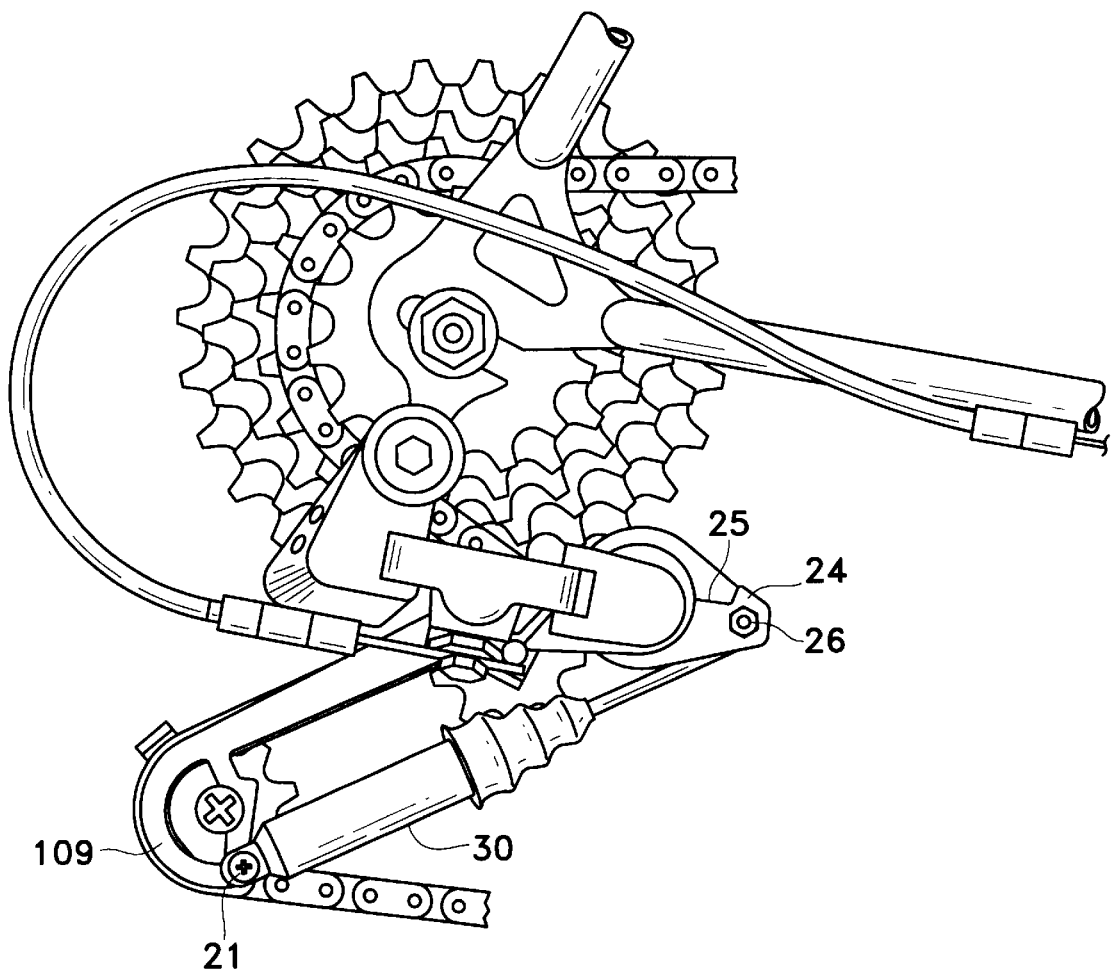
FIG. 7 is a detail view of a derailleur system showing the second embodiment of the invention in place in the fully expanded position, showing an alternative mounting configuration.

FIG. 7 shows the same damper in the fully extended position. Here, the chain is on the next to the smallest gear, as shown.

Figure 8:
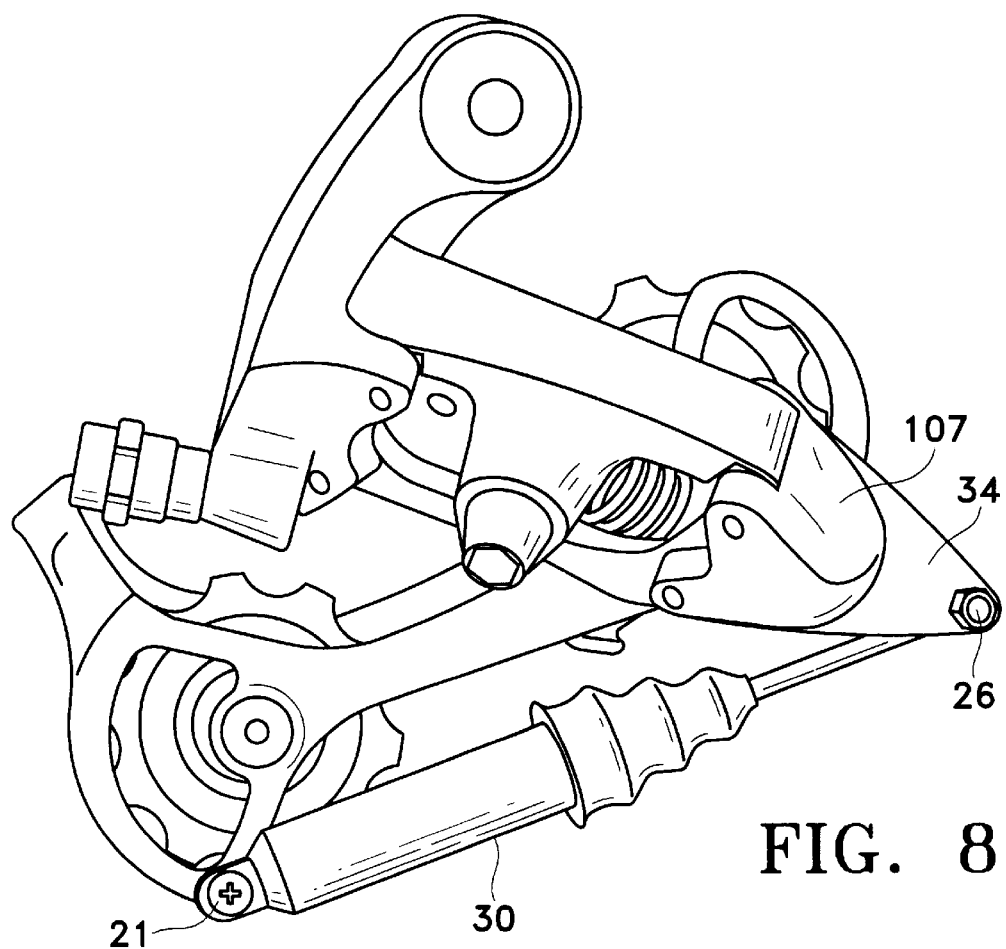
FIG. 8 is a perspective view showing the mounting brackets for the installation of the second embodiment of the invention showing a second mounting configuration.
Figure 9:
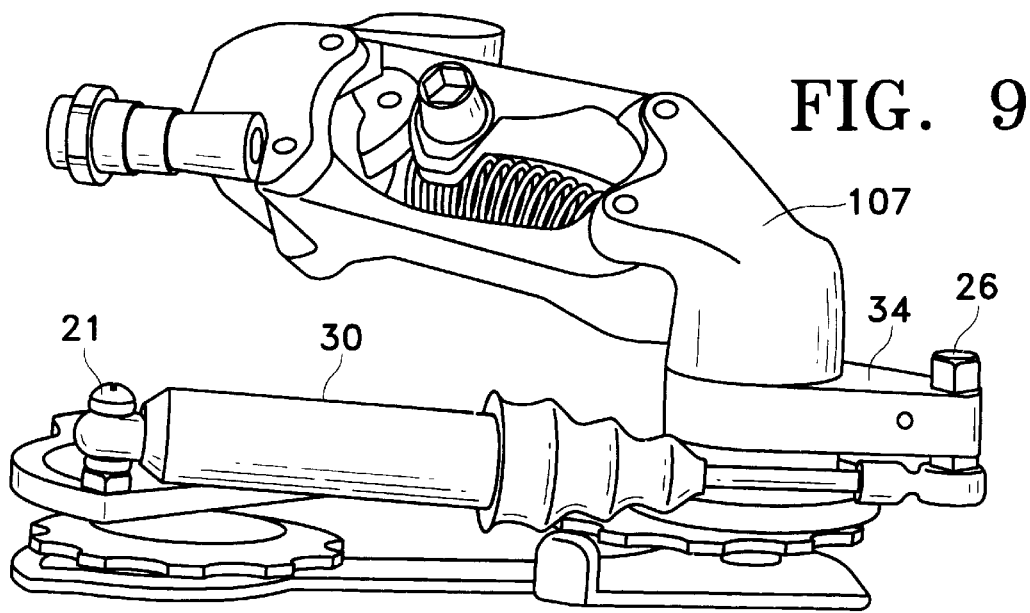
FIG. 9 is a bottom view of the second embodiment of the invention showing a second mounting configuration.

FIGS. 6 and 7 show the external damper with a removable bracket 24. This works where one wants to add the damper to an existing derailleur. However, the external damper can be attached as a factory installed damper. FIGS. 8 and 9 show an embodiment where the damper 30 is attached to a bracket 34, which is machined or cast as part of the chain tension pulley cage pivot housing 107. Instead of fitting the bracket over the housing, the bracket 34 becomes a permanent feature of the derailleur. The damper then is fastened to the derailleur using bolts or screws 21 and 26 as before. In this embodiment, the external damper is a fluid filled piston type damper common to the art. However, a gas filled damper can also be used.

The use of either damper is automatic. Once installed, the damper-either the rotary 20 or the external 30-works against the chain pulley cage pivot arm to smooth its action. Because of the damper, the derailleur cannot jerk or move sharply with changes in chain tension. As a result, the chain operates smoothly over a range of speeds and road or trail conditions. This smooth action eliminates the possibility of chain suck as the chain cannot swing wildly about. This produces a smooth, quiet, pleasurable and safe ride.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A derailleur, for a bicycle having a rear sprocket and a chain, comprising:

a) a chain pulley cage pivot, pivotably attached to said bicycle;
   b) a means for moving said chain over said derailleur; and
   c) a means for damping vibration of said chain over said derailleur, whereby said means for damping acts upon said chain pulley cage pivot.

2. The derailleur of claim 1 wherein said means for damping movement of said chain comprises a rotary damper, operably attached to said chain pulley cage pivot.

3. The derailleur of claim 1 wherein the means for moving said chain over said derailleur includes a chain tension pulley cage.

4. The bicycle derailleur of claim 3 wherein the means for damping movement of said chain comprises a fluid filled piston damper.

5. The derailleur of claim 4 wherein the fluid filled piston damper has a first end and a second end and further wherein the first end of said fluid filled piston damper is pivotably attached to said chain tension pulley cage and the second end of said fluid filled piston damper is attached to said chain pulley cage pivot.

6. The derailleur of claim 5 wherein the fluid filled piston damper is attached to said chain pulley cage pivot by a removable bracket.

7. The derailleur of claim 5 wherein the fluid filled piston damper is attached to said chain pulley cage pivot by a bracket, said bracket being fixedly attached to said chain pulley cage pivot.

8. A derailleur, for a bicycle having a rear sprocket and a chain, comprising:

a) a chain tension pulley cage pivot, pivotably attached to said bicycle, said chain tension pulley cage pivot including a housing and a control shaft;
   b) a means for moving said chain over said derailleur; and
   c) a rotary damper, operably attached to said control shaft of chain tension pulley cage pivot arm.

9. The derailleur of claim 8 wherein the rotary damper is placed within the housing of said chain tension pulley cage pivot.

10. A derailleur, having a chain tension pulley cage, for a bicycle having a rear sprocket and a chain, comprising:

a) a chain tension pulley cage pivot, pivotably attached to said bicycle, said chain pulley cage pivot arm including a housing and a control shaft;
    b) a chain tension pulley cage, in operable communication with said chain tension pulley cage pivot;
    c) a bracket, in operable communication with said housing;
    c) a means for moving said chain through said derailleur; and
    d) a fluid-filled piston damper, operably attached to said derailleur such that said fluid-filled piston damper acts upon said chain tension pulley cage pivot when said bicycle is in operation.

11. The derailleur of claim 10 wherein the fluid-filled piston damper has a first end and a second end and further wherein the first end of said fluid-filled piston damper is pivotably attached to said chain tension pulley cage and the second end of said fluid-filled piston damper is attached to said bracket.

12. The derailleur of claim 10 wherein the bracket is removable.

13. The derailleur of claim 10 wherein the bracket is formed as part of said chain pulley cage pivot housing.

* * * * *

(12) EX PARTE REEXAMINATION CERTIFICATE (8921st)
United States Patent
Guthrie

(10) Number: US 6,135,904 C1
(45) Certificate Issued: Mar. 27, 2012

(54) BICYCLE DERAILLEUR CHAIN DAMPER

(76) Inventor: Ryan G. Guthrie, Anchorage, AK (US)

Reexamination Request:
No. 90/010,944, Apr. 6, 2010

Reexamination Certificate for:
Patent No.: 6,135,904
Issued: Oct. 24, 2000
Appl. No.: 09/181,368
Filed: Oct. 28, 1998

(51) Int. Cl.
*F16H 7/08* (2006.01)

(52) U.S. Cl. .................................................. 474/82
(58) Field of Classification Search .......... 188/306–310, 188/293, 294, 248, 290; 474/82
See application file for complete search history.

(56) References Cited

To view the complete listing of prior art documents cited during the proceeding for Reexamination Control Number 90/010,944, please refer to the USPTO's public Patent Application Information Retrieval (PAIR) system under the Display References tab.

*Primary Examiner* — Matthew C. Graham

(57) ABSTRACT

A damper that functions in cooperation with the chain take-up to introduce improved smoothness during bicycle operation. The hydraulic damper is a cylinder that has a spring driven piston mounted in it. The spring is controlled by a fluid within the cylinder. This fluid smoothes out or otherwise controls jerky or other unwanted vibration by applying fluid forces to the take-up piston so that a relatively constant pressure is applied against the drive chain. This allows that chain to flow over the sprockets and chain slides without, looseness, unintentional gear shifts or objectionable noise.

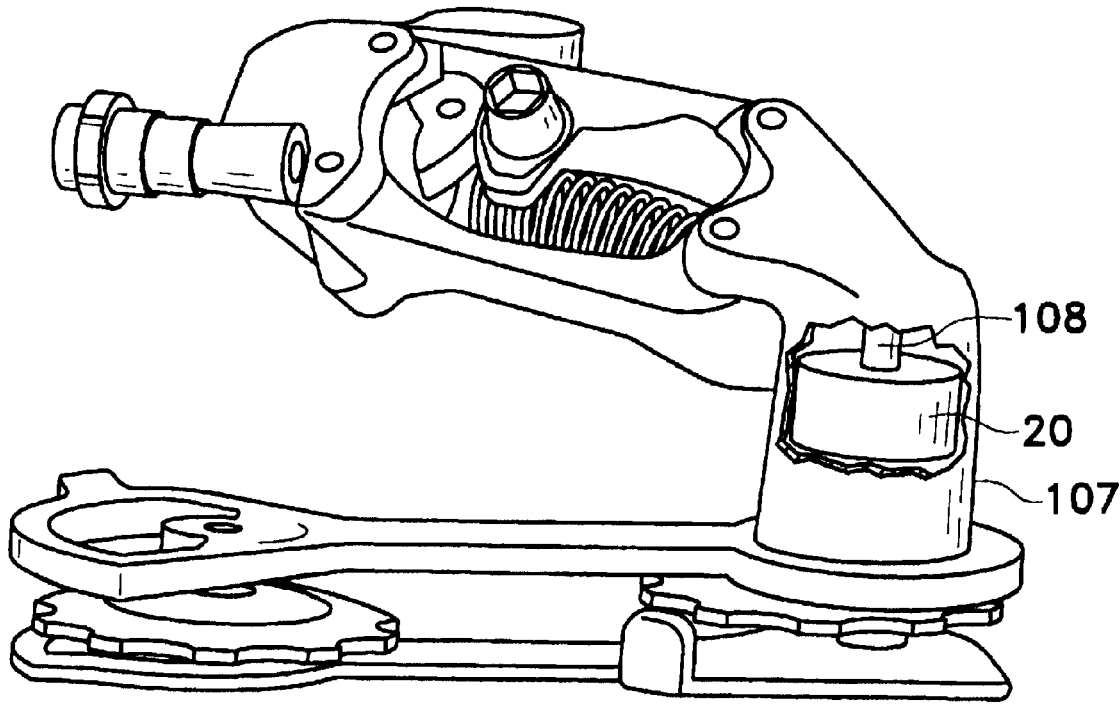

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8 and 10 are determined to be patentable as amended.

Claims 2-7, 9 and 11-13 dependent on an amended claim, are determined to be patentable.

1. A derailleur, for a bicycle having a rear sprocket and a chain, comprising:
   a) a chain pulley cage pivot, pivotably attached to said bicycle;
   b) a means for moving said chain over said derailleur; and
   c) a means for damping vibration of said chain over said derailleur, whereby said means for damping acts *bi-directionally* upon said chain pulley cage pivot.

8. A derailleur, for a bicycle having a rear sprocket and a chain, comprising:
   a) a chain tension pulley cage pivot, pivotably attached to said bicycle, said chain tension pulley cage pivot including a housing and a control shaft;
   b) a means for moving said chain over said derailleur; and
   c) a *bi-directional* rotary damper, operably attached to said control shaft of chain tension pulley cage pivot [arm].

10. A derailleur, [having a chain tension pulley cage], for a bicycle having a rear sprocket and a chain, comprising:
   a) a chain tension pulley cage pivot, pivotably attached to said bicycle, said chain pulley cage pivot [arm] including a housing and a control shaft;
   b) a chain tension pulley cage, in operable communication with said chain tension pulley cage pivot;
   c) a bracket, in operable communication with said housing;
   c) a means for moving said chain through said derailleur; and
   d) a fluid-filled piston damper, operably attached to said derailleur such that said fluid-filled piston damper acts upon said chain tension pulley cage pivot when said bicycle is in operation.

* * * * *